United States Patent
Vijil et al.

(10) Patent No.: US 11,161,029 B2
(45) Date of Patent: *Nov. 2, 2021

(54) SPORT TRAINING ON AUGMENTED/VIRTUAL REALITY DEVICES BY MEASURING HAND-EYE COORDINATION-BASED MEASUREMENTS

(71) Applicant: INTERNATIONAL BUSINESS MACHINES CORPORATION, Armonk, NY (US)

(72) Inventors: Enara C. Vijil, Millwood, NY (US); Dipyaman Banerjee, Vasant Kunj (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/794,996

(22) Filed: Feb. 19, 2020

(65) Prior Publication Data

US 2020/0188762 A1 Jun. 18, 2020

Related U.S. Application Data

(63) Continuation of application No. 15/676,499, filed on Aug. 14, 2017, now Pat. No. 10,617,933.

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0006* (2013.01); *A63B 69/0017* (2013.01);
(Continued)

(58) Field of Classification Search
None
See application file for complete search history.

(56) References Cited

U.S. PATENT DOCUMENTS 4,325,697 A 4/1982 Regan
8,574,101 B2 11/2013 Wheelbarger
(Continued)

FOREIGN PATENT DOCUMENTS

WO 2015031049 A1 3/2015

OTHER PUBLICATIONS

Cai et al., "Tactile VR for hand-eye coordination in simulated PTCA", Computers in Biology and Medicine 36 (2006), pp. 167-180, www.intl.elsevierhealth.com/journals/cobm, Copyright 2004 Elsevier Ltd.

(Continued)

*Primary Examiner* — Jay Trent Liddle
(74) *Attorney, Agent, or Firm* — Michael O'Keefe (57) ABSTRACT

A method, computer system, and computer program product for sport training on an augmented reality device or a virtual reality device is provided. The embodiment may include capturing a plurality of user movement data using one or more sensors. The embodiment may also include measuring a user body and eye gaze position based on the plurality of captured user movement data. The embodiment may further include calculating a body position difference by comparing the measured user body and eye gaze position with an expert-specified body position sequence. The embodiment may also include determining a body position quality threshold is not satisfied based on the calculated body position difference. The embodiment may further include generating an instruction based on the compared calculated body position difference.

15 Claims, 6 Drawing Sheets

(51) Int. Cl.
*G09B 5/06* (2006.01)
*G09B 19/00* (2006.01)
*G09B 9/00* (2006.01)
*A63B 69/00* (2006.01)
*A63B 69/38* (2006.01)
*A63B 102/16* (2015.01)
*G06F 3/01* (2006.01)

(52) U.S. Cl.
CPC ............... *A63B 69/38* (2013.01); *G09B 5/06* (2013.01); *G09B 9/00* (2013.01); *G09B 19/0038* (2013.01); *A63B 69/0015* (2013.01); *A63B 2024/0012* (2013.01); *A63B 2071/063* (2013.01); *A63B 2071/0666* (2013.01); *A63B 2102/16* (2015.10); *A63B 2220/40* (2013.01); *A63B 2220/803* (2013.01); *A63B 2220/805* (2013.01); *A63B 2220/836* (2013.01); *A63B 2230/06* (2013.01); *G06F 3/013* (2013.01)

(56) References Cited

U.S. PATENT DOCUMENTS

| | | | |
|---|---|---|---|
| 9,286,711 | B2 | 3/2016 | Geisner |
| 2008/0312010 | A1 | 12/2008 | Marty |
| 2009/0036801 | A1 | 2/2009 | Chuang |
| 2010/0015585 | A1 | 1/2010 | Baker |
| 2011/0007275 | A1 | 1/2011 | Yoo |
| 2012/0092618 | A1 | 4/2012 | Yoo |
| 2013/0095924 | A1 | 4/2013 | Geisner |
| 2015/0051024 | A1 | 2/2015 | Churchman |
| 2015/0064643 | A1 | 3/2015 | Chun |
| 2015/0112464 | A1 | 4/2015 | Crowley |
| 2015/0248792 | A1 | 9/2015 | Abovitz |
| 2015/0379351 | A1* | 12/2015 | Dibenedetto ...... H04N 5/44504 345/633 |
| 2016/0202755 | A1 | 7/2016 | Connor |
| 2016/0275805 | A1 | 9/2016 | Reichow |
| 2016/0275814 | A1 | 9/2016 | Ellis |
| 2016/0314620 | A1 | 10/2016 | Reilly |
| 2017/0151484 | A1 | 6/2017 | Reilly |
| 2017/0333755 | A1 | 11/2017 | Rider |
| 2019/0046859 | A1 | 2/2019 | Vijil |

OTHER PUBLICATIONS

Mell et al., "The NIST Definition of Cloud Computing," National Institute of Standards and Technology, Sep. 2011, p. 1-3, Special Publication 800-145.

Tsai et al., "A New Technique for Fully Autonomous and Efficient 3D Robotics Hand/Eye Calibration", IEEE Transactions on Robotics and Automation, vol. 5, No. 3, Jun. 1989, pp. 345-358, Copyright 1989 IEEE.

IBM: List of IBM Patents or Patent Applications Treated as Related (Appendix P), Mar. 11, 2020, pp. 1-2.

* cited by examiner

SPORT TRAINING ON AUGMENTED/VIRTUAL REALITY DEVICES BY MEASURING HAND-EYE COORDINATION-BASED MEASUREMENTS

BACKGROUND

The present invention relates, generally, to the field of computing, and more particularly to augmented/virtual reality (AR/VR).

Augmented reality may relate to technology that superimposes computer-generated imagery over a real world picture, video, or environment. Virtual reality may relate to a fully computer-generated simulation of a three-dimensional environment. Both augmented reality and virtual reality systems function through the implementation of devices, such as headsets or displays, that project the computer-generated imagery to the user's field of vision. Applications of AR/VR technology may include video gaming, cinema, education and training, engineering, and fine arts.

SUMMARY

According to one embodiment, a method, computer system, and computer program product for sport training on an augmented reality device or a virtual reality device is provided. The embodiment may include capturing a plurality of user movement data using one or more sensors. The embodiment may also include measuring a user body and eye gaze position based on the plurality of captured user movement data. The embodiment may further include calculating a body position difference by comparing the measured user body and eye gaze position with an expert-specified body position sequence. The embodiment may also include determining a body position quality threshold is not satisfied based on the calculated body position difference. The embodiment may further include generating an instruction based on the compared calculated body position difference.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to augmented/virtual reality (AR/VR). The following described exemplary embodiments provide a system, method, and program product to, among other things, utilize an AR/VR system for sport training that provides instructional feedback to a user. Therefore, the present embodiment has the capacity to improve the technical field of AR/VR by instantaneously measuring a user's movements through leveraging hand-eye coordination in a sports domain to provide sport performance feedback and instruction to a user.

As previously described, augmented reality may relate to technology that superimposes computer-generated imagery over a real world picture, video, or environment. Virtual reality may relate to a fully computer-generated simulation of a three-dimensional environment. Both augmented reality and virtual reality systems function through the implementation of devices, such as headsets or displays, that project the computer-generated imagery to the user's field of vision. Applications of AR/VR technology may include video gaming, cinema, education and training, engineering, and fine arts. AR/VR devices have become commonplace in the electronics landscape and have become excellent tools in the previously described various areas of application. For example, simulations may be conducted to study customer reactions to merchandise positions in a retail store setting.

Similarly, eye gaze tracking is commonly encountered technology that studies the direction of an individual's gaze or eye motion relative to the individual's head. Being able to track an individual's eye gaze is a vital tool to understanding how an individual may visually interact with an environment. For example, if eye gaze tracking is used on an individual driving a motor vehicle, an analysis of the captured data may illustrate where the driver's eyes focus during specific scenarios, such as stopped at a red light, while approaching oncoming traffic, when an animal suddenly cross the vehicle's path, or when driver is involved in a collision with another vehicle.

Hand movement tracking is an area of positional tracking that utilizes motion capture to determine the relative position of an individual's hands in space. Hand movement tracking may be made capable by utilizing sensor-based or video-based techniques. For example, in sensor-based tracking, one or more sensors may be affixed to an individual's hands or body in general and measuring the movement of each sensor may provide data that allows a user to track the movement of the individual's hands. Similarly, in video-based tracking, one or more devices capable of capturing videos may record the individual's movements and use image recognition technology to measure the individual's hand position.

Individual's hand-eye coordination may have previously been calculated. However, calculating hand-eye coordination through measurements captured using hand-worn sensors and camera-based gaze tracking have not been utilized. As such, it may be advantageous to, among other things, leverage hand-eye coordination in the sports training domain to automatically provide live instructions, post-training/post-match annotations, or real-time feedback.

According to one embodiment, a user may wear an AR/VR device that is capable of simulating the experience of playing a sport, such as tennis, badminton, table tennis, or cricket, and performing eye gaze tracking in the AR/VR coordinates. While engaging in the simulation provided by the AR/VR device, the user may wear one or more sensors, such as an accelerometer or a gyroscope, on or around their hands to gather hand movement data. While performing actions relevant to a specific sport, hand-eye coordination may be calculated by observing temporal sequences of hand movements and eye gaze movements, correlating temporal sequences, and matching snapshots of hand and gaze positions with a set of specified permissible correlations. The specified permissible correlations may be externally provided by a human expert and stored in a database. When matching the captured hand movement against specified permissible correlations, feedback or an instruction may be generated when the difference between the sets exceeds a threshold value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize an AR/VR device and one or more sensors for measuring hand position and eye gaze tracking to measure user hand-eye coordination. If the measured user hand-eye coordination exceeds a threshold value, an instruction may be generated and presented to the user.

Figure 1:
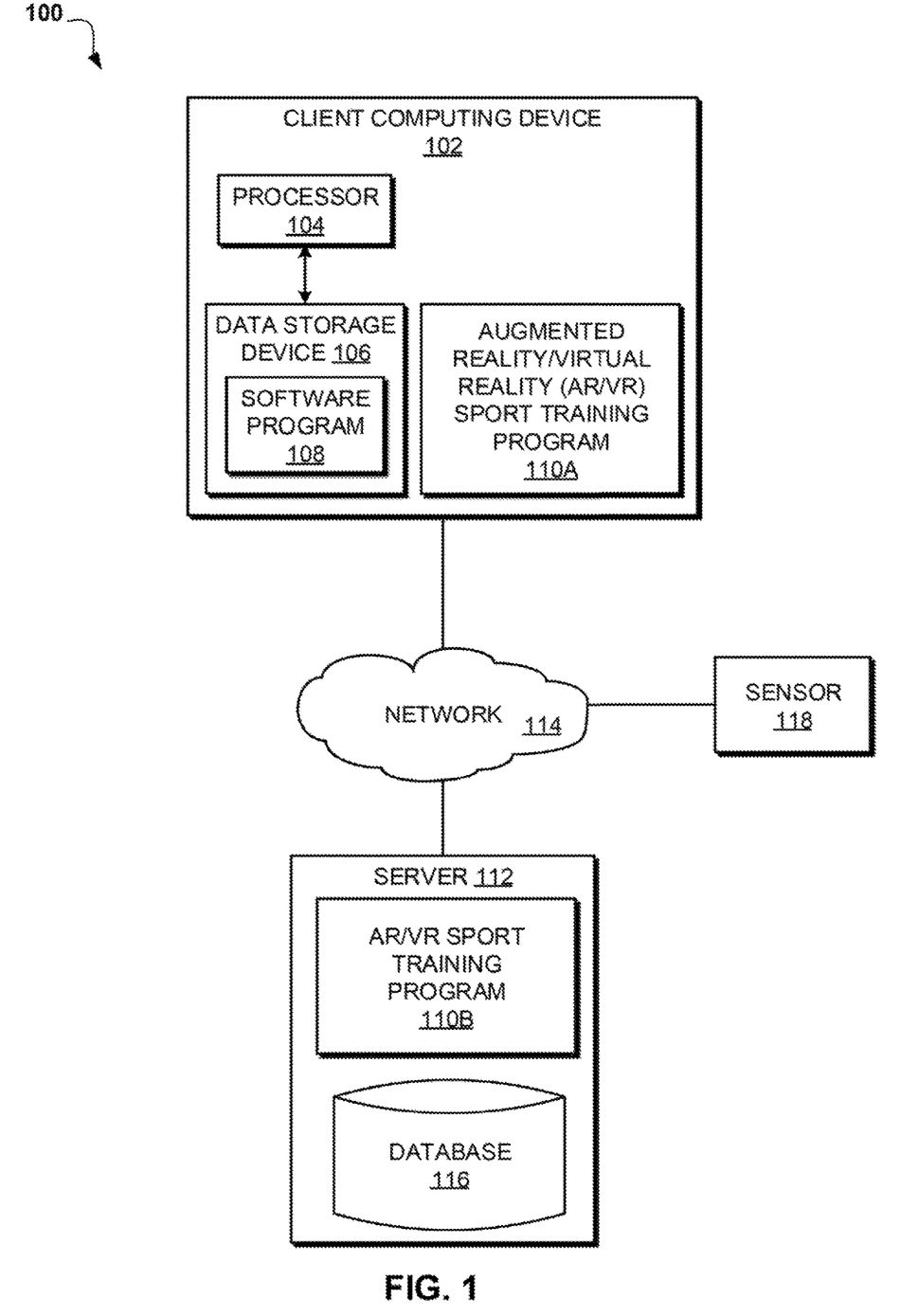
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an AR/VR sport training program 110A and communicate with the server 112 via the communication network 114, in accordance with one embodiment of the invention. Client computing device 102 may be, for example, an augmented reality device, a virtual reality device, a mobile device, a telephone, a personal digital assistant, a netbook, a laptop computer, a tablet computer, a desktop computer, or any type of computing device capable of running a program and accessing a network. In at least one embodiment, the client computing device 102 may have one or more sensors 118 either internally and/or externally connected. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an AR/VR sport training program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The sensor 118 may be a device capable of capturing user movement data and/or user eye gaze tracking data from the user or surrounding environment, such as an accelerometer, a gyroscope, or a magnetometer, and connecting to the client computing device 102 and the server 112 via the network 114. Additionally, the sensor 118 may store the captured data in a repository, such as database 116. In at least one embodiment, the sensor 118 may be either internally or externally connected to the client computing device 102 to allow for capturing user movement and/or eye gaze tracking data, such as an AR/VR headset tracking and capturing the user's eye gaze.

Database 116 may be a data repository capable of storing hand-eye coordination data. The hand-eye coordination data may be a sequence of actions, such as a range of hand positions or a range of permissible gaze positions for each hand position, with respect to a finite number of discrete event states of each intended action and a prescribed method to conduct a specific action. For example, in the sport of tennis, an event may be a tennis ball rushing towards the right hand side of a right-handed player with the ball speed being approximately 80 miles per hour and the ball distance and height varying as a function of time. An intended action for this scenario may be a forehand return shot and a prescribed reaction may be a set of entities comprising of a forehand crosscourt return, a middle-of-the-court forehand return and a forehand down-the-line return. Additionally, the hand-eye coordination, or movement, data stored in database 116 may be analyzed at the time the data is captured or stored in the database for later analysis and instruction generation by the AR/VR sport training program 110A, 110B.

According to the present embodiment, the AR/VR sport training program 110A, 110B may be a program capable of capturing user movement data and user eye gaze data using an AR/VR device and one or more sensors 118 and comparing the captured user movement data and user eye gaze data against an expert-specified data set stored in a repository, such as database 116. If the differential between the captured user data set and the expert-specified data set exceeds a threshold, the AR/VR sport training program 110A, 110B may generate an instruction and present the generated instruction to the user in both an online and offline scenario. The AR/VR sport training method is explained in further detail below with respect to FIG. 3.

Figure 2:
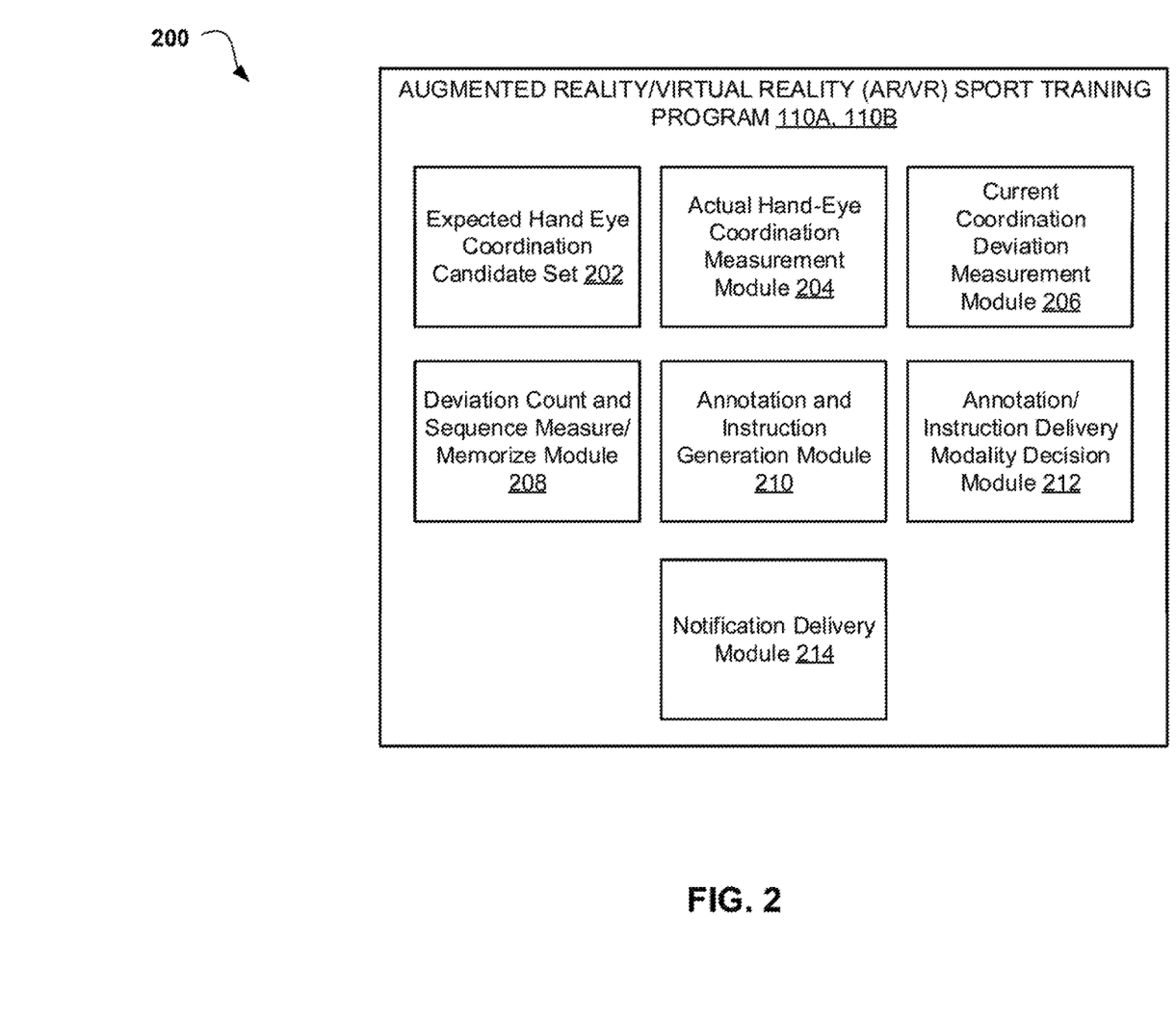
FIG. 2 is a component block diagram according to at least one embodiment.

FIG. 2 is a component block diagram 200 according to at least one embodiment. The AR/VR sport training program 110A, 110B may include an expected hand-eye coordination candidate set 202, an actual hand-eye coordination measurement module 204, a current coordination deviation measurement module 206, a deviation count and sequence measure/memorize module 208, an annotation and instruction generation module 210, an annotation/instruction delivery modality decision module 212, and a notification delivery module 214.

The expected hand-eye coordination candidate set 202 may be a set of movements stored in a repository, such as database 116 or data storage device 106, that represent the expected movements and eye gazes a user should perform during specific actions in sports training. For example, to perform an effective swing in the sport of golf, a user may need to execute specific timed actions, the expected hand-eye coordination candidate set 202 may represent the user eye focus and hand movements that need to be performed by the user to execute an effective swing. The expected hand-eye coordination candidate set 202 may be generated by observing historical behavior within a sport and specific actions within the sport. For example, the AR/VR sport training program 110A, 110B may observe historical data related to the sport of tennis and determine specific actions that result in a well hit serve. Therefore, the AR/VR sport training program 110A, 110B may generate the expected hand-eye coordination candidate set 202 based on the observed actions that may result in a well hit serve in tennis. In at least one embodiment, the AR/VR sport training program 110A, 110B may generate the expected hand-eye coordination candidate set 202 by observing an expert perform a specific action rather than analyzing historical data that may relate to more than one expert or individual. For example, the AR/VR sport training program 110A, 110B may analyze the actions of a tennis professional giving a lesson and determine the specific actions needed for a well hit tennis serve to include in the expected hand-eye coordination candidate set 202.

The actual hand-eye coordination measurement module 204 may be a set of user movements and eye gazes stored in a repository, such as database 116 or data storage device 106, that represent user movements and eye gazes while performing specific actions in sports training. For example, while practicing tennis, a user may where one or more sensors capable of recording hand movements and eye gaze tracking to generate the actual hand-eye coordination measurement module 204.

The current coordination deviation measurement module 206 may be capable of comparing the expected hand-eye coordination candidate set 202 with the actual hand-eye coordination measurement module 204 to calculate a differential. The calculated differential between the expected hand-eye coordination candidate set 202 and the actual hand-eye coordination measurement module 204 may be a numerical value for each portion of the user's body that varies from the expected body position an expert may hold. For example, if an expert's arm angle when swinging a tennis racket to return a volley is 30° but the user's actual arm angle is 40°, the current coordination deviation measurement module 206 may be capable of comparing the expected hand-eye coordination candidate set 202 and the actual hand-eye coordination measurement module 204 to determine that the user arm angle is 10° off from an expert's arm angle. In at least one embodiment, a series of correlations may be calculated by the current coordination deviation measurement module 206, such as a correlation of the user's and expert's eye gaze positions, a correlation of the user's and expert's hand and body movements, and a correlation of the expert's hand and body movements and eye gaze positions with the user's hand and body movements and eye gaze positions.

The deviation count and sequence measure/memorize module 208 may be capable of understanding the differential of the expected hand-eye coordination candidate set 202 with the actual hand-eye coordination measurement module 204 as calculated by the current coordination deviation measurement module 206 across time and over a number of instances. For example, the deviation count and sequence measure/memorize module 208 may start reviewing the differential between the user's movements and the expected expert's movements at time, t=0, and keep track of the user's movements for a specified period of time (e.g., 2 hours, t=120 minutes). During the specified period of time, the deviation count and sequence measure/memorize module 208 may count the number of instances or the percentage of times the user movements and eye gazes differ from the expected expert movements and eye gazes by a movement threshold. For example, if the user's arm angle for forehand shots is more than 5° different from the expected expert arm angle for forehand shots, the deviation count and sequence measure/memorize module 208 may increment a count by one. Similarly, if the user's eye gaze is not less than or equal to a given threshold distance of an expert's as detailed in the expected hand-eye coordination candidate set 202, the deviation count and sequence measure/memorize module 208 may increment the count by one. In at least one embodiment, the AR/VR sport training program 110A, 110B may maintain separate counts for each body movement and eye gaze position. If the count exceeds a count threshold for a given period of time, the AR/VR sport training program 110A, 110B may determine an instruction for the movement may be generated. For example, if the user's tennis forehand return exceeds the expected angle 20 times in 100 practice forehand returns and the count threshold is preconfigured to 15%, the AR/VR sport training program 110A, 110B, through the deviation count and sequence measure/memorize module 208, may determine that the user's movements did not satisfy the expected expert movements 20% of the time thereby exceeding the count threshold.

The annotation and instruction generation module 210 may be a program capable of generating an instruction for the user based on the calculated difference between the expected hand-eye coordination candidate set 202 and the actual hand-eye coordination measurement module 204. The generated instruction may be tailored to correct any specific deviation from the expert expected movement that is displayed in the captured user movement. For example, in the previously described scenario where the expert's arm angle when swinging a tennis racket to return a volley is 30° but the user's actual arm angle is 40°, the annotation and instruction generation module 210 may generate an instruction intended to decrease the user's arm angle on a forehand swing by 10° so the user's arm angle is within an acceptable value of an expert's arm angle. The annotation and instruction generation module 210 may include or omit instruction for various areas depending on the differences between the expected hand-eye coordination candidate set 202 and the actual hand-eye coordination measurement module 204. For example, the generated instruction may include an area for instruction to improve the user's forehand swing but no instruction for the user's backhand swing since the user's backhand swing may be within an acceptable threshold.

The annotation/instruction delivery modality decision module 212 may be a program capable of filtering the generated instructions based on user preferences. For example, the user may choose to not receive instruction on areas that do not exceed a threshold that warrant generation of an instruction. Therefore, an instruction generated for a user's backhand that conveys no improvement is needed may be filtered out and not presented to a user. However, an instruction generated for a user's forehand that provides detailed improvements to the user's forehand may be presented to the user.

The notification delivery module 214 may be a program capable of transmitting the instruction to the user for display. For example, once the annotation/instruction delivery modality decision module 212 filters out instructions according to user configuration, the notification delivery module 214 may actually deliver the instruction to the user.

Figure 3:
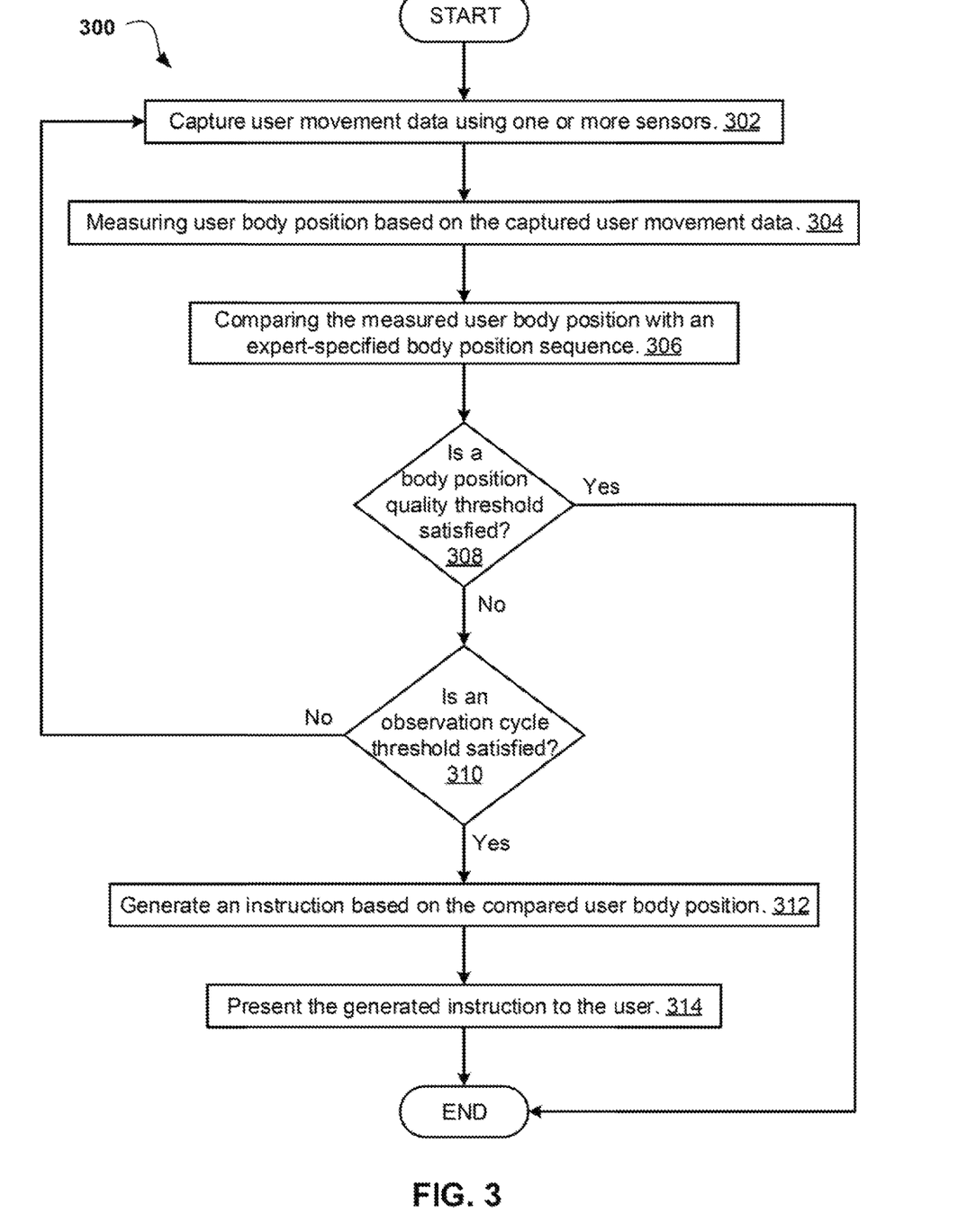
FIG. 3 is an operational flowchart illustrating an augmented/virtual reality sport training process according to at least one embodiment.

FIG. 3 is an operational flowchart illustrating an augmented/virtual reality sport training process 300 according to at least one embodiment. At 302, the AR/VR sport training program 110A, 110B captures user movement data using one or more sensors. While engaging in a sports activity, the AR/VR sport training program 110A, 110B may utilize one or more sensors, such as a gyroscope, an accelerometer, a magnetometer, an eye gaze tracker, or a heart rate monitor, to capture user movement data. Additionally, the user movement data may include user hand position, user eye gaze tracking, user head position, user arm position, user leg position, and user hip position.

Then, at 304, the AR/VR sport training program 110A, 110B measures user body positions and user eye gaze positions based on the captured user movement data. Once the user movement data is captured, the AR/VR sport training program 110A, 110B may analyze the captured user movement data to determine specific measurements associated with the user body positions and user eye gaze positions throughout different motions. For example, if the user is engaging in the sport of golf, the AR/VR sport training program 110A, 110B may calculate specific measurements of the user's leg positions, hip positions, hand movements, head position, arm angles, swing speed, club speed, and hand speed. The measured user body positions and user eye gaze positions may be stored in a repository, such as database 116, as actual hand-eye coordination measurement module 204.

Next, at 306, the AR/VR sport training program 110A, 110B calculates a difference between the measured user body and eye gaze positions and an expert-specified body position sequence. Once the measurements of the user's body position and user eye gaze positions are calculated, the AR/VR sport training program 110A, 110B may compare the user's measured body positions and user eye gaze positions in the actual hand-eye coordination measurement module 204 with the expert-specified body and eye gaze positions in the expected hand-eye coordination candidate set 202 by utilizing the current coordination deviation measurement module 206. The current coordination deviation measurement module 206 may calculate the deviation of the user body and eye gaze positions from the expert-specified body positions in order to determine if the user body positions exceed a movement threshold. For example, if a user's hips are to be square (aligned with the user's feet) in the sport of golf when the user's golf club impacts the ball but the user's hips are 10° open, the current coordination deviation measurement module 206 may record the 10° deviation.

Then, at 308, the AR/VR sport training program 110A, 110B determines whether a user body position quality threshold is satisfied. According to one implementation, the augmented/virtual reality sport training process 300 may continue along the operational flowchart if a body position quality threshold is satisfied. The body position quality threshold may be a minimum difference value between the expert-specified body position sequence and the user body position for which an instruction may be generated and provided to a user. If the measured difference between the expert-specified body position sequence and the user body position satisfy (i.e., is equal to or below the body position quality threshold) generation of a corrective instruction to be provided to the user may not be necessary. For example, if the body position quality threshold is preconfigured to 10° and the difference between the expert-specified body position sequence and the user body position for a tennis forehand is 5°, the AR/VR sport training program 110A, 110B may determine the user body position quality threshold is satisfied and no instruction to correct the user body position is needed. Conversely, if the body position quality threshold is preconfigured to 10° and the difference between the expert-specified body position sequence and the user body position for a tennis forehand is 15°, the AR/VR sport training program 110A, 110B may determine the user body position quality threshold is not satisfied and an instruction to correct the user body position is needed. Furthermore, in each instance that the body position quality threshold is not satisfied (i.e., the different between user body position and the expert-specified body position sequence is greater than the body position quality threshold), a counter is incremented by one unit. Additionally, the body position quality threshold may be configurable by the user before each activity or training session to allow for different levels of difficulty or user skill levels. If the AR/VR sport training program 110A, 110B determines a body position quality threshold is satisfied (step 308, "Yes" branch), the augmented/virtual reality sport training process 300 may terminate. If the AR/VR sport training program 110A, 110B determines a body position quality threshold is not satisfied (step 308, "No" branch), the augmented/virtual reality sport training process 300 may continue to step 310 to determine whether an observation cycle threshold is satisfied.

Next, at 310, the AR/VR sport training program 110A, 110B determines whether an observation cycle threshold is satisfied. According to one implementation, the augmented/virtual reality sport training process 300 may continue along the operational flowchart if an observation cycle threshold is satisfied. During a sports activity, a user may repeat the same movement a number of times. For example, a user may be practicing overhand serves and, therefore, repeat the same body movements a number of times. As previously described, if the user body position in each repeated action exceeds the body position quality threshold, the AR/VR sport training program 110A, 110B increments a counter by one unit. The observation cycle threshold may be satisfied when the counter is incremented to a value equal to the observation cycle threshold value. For example, if the observation cycle threshold value is preconfigured to 20%, the AR/VR sport training program 110A, 110B may be satisfied when the counter value is incremented to 20 and the total number of overhand tennis serves is equal to 100 serves. Similarly, if the observation cycle threshold value is 10 units, the AR/VR sport training program 110A, 110B may generate an instruction for the user when 10 instances of the body position quality threshold being exceeded have elapsed regardless of the number of total number of user movements needed to reach the 10 instances. Additionally, similar to the configurations available for the body position quality threshold described in step 308, the observation cycle threshold may be configurable by the user before each activity or training session to allow for different levels of difficulty or user skill levels. For example, the observation cycle threshold value may be set to a value of one in situations where the user wishes to receive real-time live feedback on each movement. If the AR/VR sport training program 110A, 110B determines an observation cycle threshold is satisfied (step 310, "Yes" branch), the augmented/virtual reality sport training process 300 may continue to step 312 to generate an instruction based on the compared user body position. If the AR/VR sport training program 110A, 110B determines an observation cycle threshold is not satisfied (step 310, "No"

branch), the augmented/virtual reality sport training process 300 may return to step 302 to capture user movement date using one or more sensors.

Then, at 312, the AR/VR sport training program 110A, 110B generates an instruction based on the compared user body position. If the AR/VR sport training program 110A, 110B determines the observation cycle threshold is satisfied, the AR/VR sport training program 110A, 110B generate a written or verbal instruction intended to correct the user body position to be more in accordance with the expert-specified body position sequence. For example, continuing the scenario described above relating to a tennis forehand, if the user's forehand swing is 15° different from the expert-specified forehand angle, the AR/VR sport training program 110A, 110B may generate an instruction that may inform the user the forehand swing differs from an expert's forehand swing by 15° along with instructional methods intended to correct common mistakes that lead to the angular difference. The AR/VR sport training program 110A, 110B may provide the instruction in real-time as part of a live feedback mode or in an offline mode that only presents the instruction at the conclusion the activity or training exercise. In at least one embodiment, the AR/VR sport training program 110A, 110B may use known image recognition technology to specifically determine the aspect of the user body position that may be causing the difference from the expert-specified body position sequence. In another embodiment, the AR/VR sport training program 110A, 110B may utilize a real-time speech instruction or real-time written messages that flash across a display on the AR/VR device if the user is learning the sport in a live-feedback mode.

Next, at 314, the AR/VR sport training program 110A, 110B presents the generated instruction to the user. Once generated, the AR/VR sport training program 110A, 110B may present the instruction to the user based on user configurations. For example, if the user selected real-time live feedback for the activity, the generated instruction may be presented to the user immediate once the preconfigured observation count threshold has been satisfied. Depending on the type of instruction, the AR/VR sport training program 110A, 110B may present the instruction as a verbal sequence presented through a speaker on the AR/VR device or another device connected via network 114 capable of presenting verbal instruction or as a written instruction sequence displayed on a graphical user interface or other display visible to the user.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
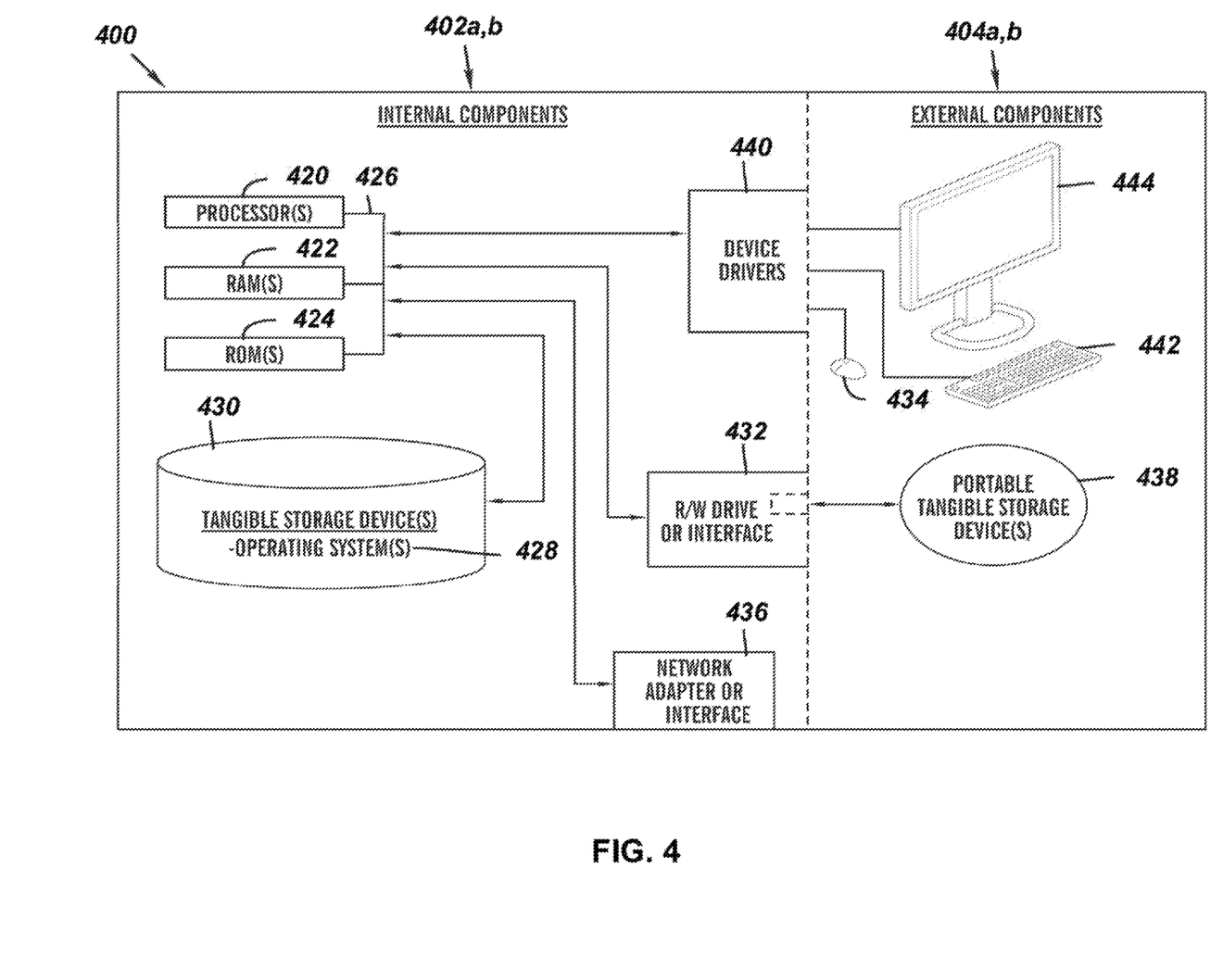
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the AR/VR sport training program 110A in the client computing device 102 and the AR/VR sport training program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the AR/VR sport training program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the AR/VR sport training program 110A in the client computing device 102 and the AR/VR sport training program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the AR/VR sport training program 110A in the client computing device 102 and the AR/VR sport training program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
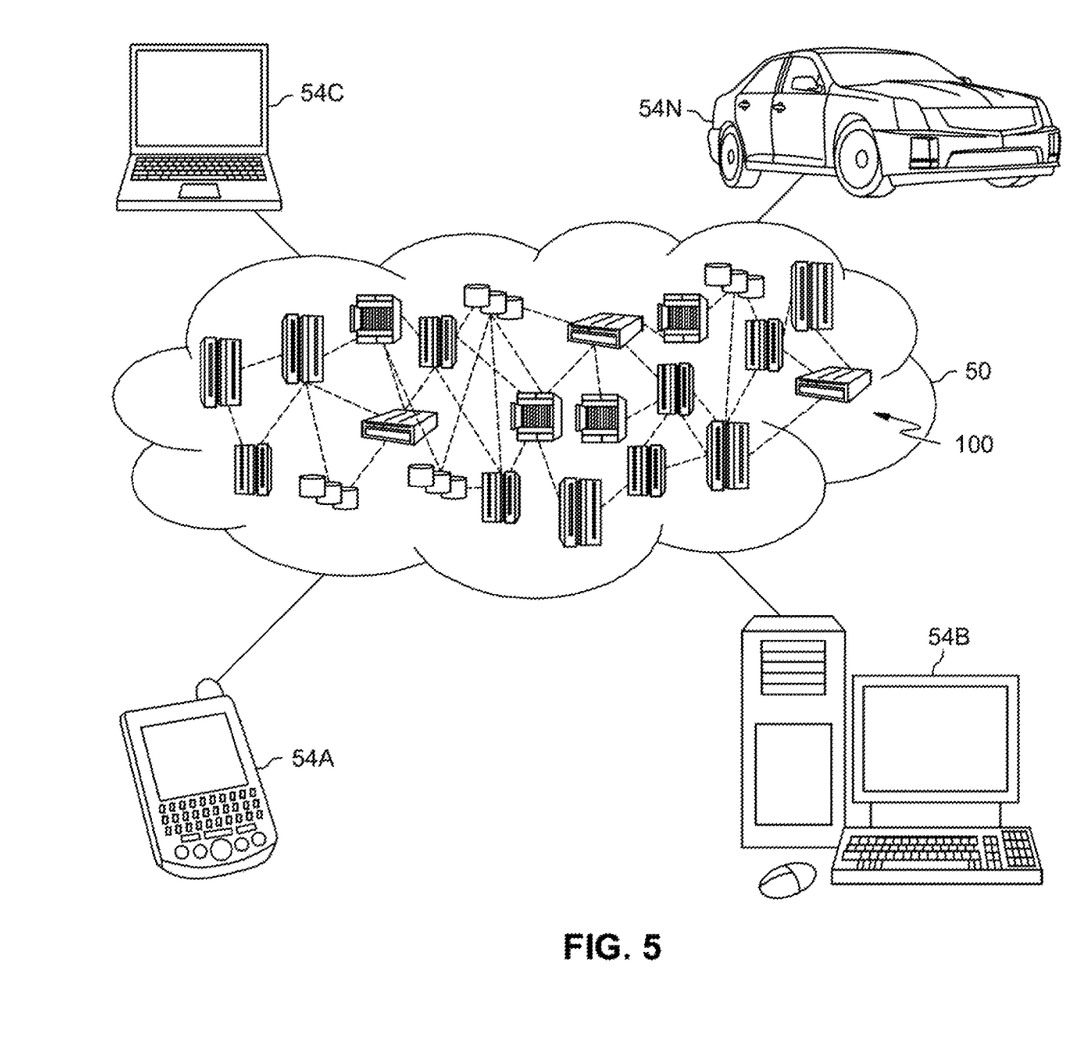
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
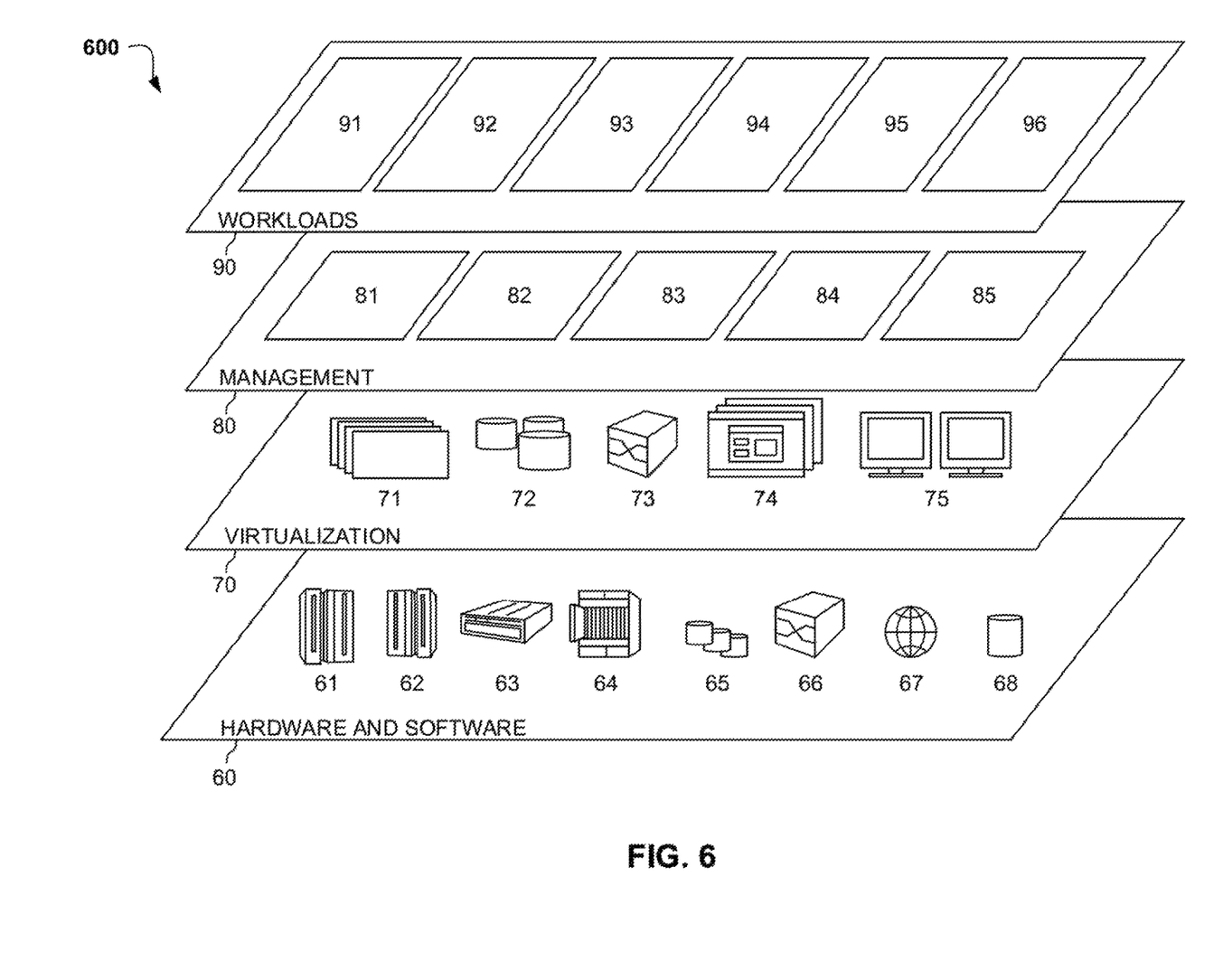
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AR/VR sport training 96. AR/VR sport training 96 may relate to analyzing captured user movement data by comparing the captured data with an expert-specified body position and, when the difference between the captured data and the expert-specified body position exceeds a threshold, generating and presenting an instruction to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for sport training on an augmented reality device or a virtual reality device, the method comprising:
   measuring a user body and eye gaze position based on a plurality of captured user movement data;
   calculating a body position difference by comparing the measured user body and eye gaze position with a preconfigured body position sequence, wherein the calculated body position difference comprises a numerical value for each portion of the user body that varies from the preconfigured body position sequence;
   in response to determining a body position quality threshold has not been satisfied based on the calculated body position difference, generating an instruction based on the calculated body position difference, wherein the generated instruction informs a user that the plurality of captured user movement data differs from the preconfigured body position sequence and an aggregate value of the difference between different body positions; and
   displaying the generated instruction as a real-time written message on a display screen of the augmented reality device or the virtual reality device.

2. The method of claim 1, wherein determining a body position quality threshold is not satisfied further comprises:
   incrementing a counter by one unit.

3. The method of claim 2, further comprising:
   determining an observation cycle threshold is satisfied based on the incremented counter.

4. The method of claim 1, wherein the one or more sensors is selected from a group consisting of a gyroscope, an accelerometer, a magnetometer, an eye gaze tracker, or a heart rate monitor.

5. The method of claim 1, further comprising:
   filtering the generated instruction based on a plurality of user preferences.

6. The method of claim 1, wherein calculating the body position difference further comprises:
   calculating a series of correlations, wherein the series of correlations are a correlation of a plurality of user eye gaze positions and a plurality of preconfigured eye gaze positions, a correlation of a plurality of user hand and body movements and a plurality of preconfigured hand and body movements, and a correlation of a plurality of preconfigured hand and body movements and a plurality of preconfigured eye gaze positions with a plurality of user hand and body movements and a plurality of user eye gaze positions.

7. A computer system for sport training on an augmented reality device or a virtual reality device, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   measuring a user body and eye gaze position based on a plurality of captured user movement data;
   calculating a body position difference by comparing the measured user body and eye gaze position with a preconfigured body position sequence, wherein the calculated body position difference comprises a numerical value for each portion of the user body that varies from the preconfigured body position sequence;
   in response to determining a body position quality threshold has not been satisfied based on the calculated body position difference, generating an instruction based on the calculated body position difference, wherein the generated instruction informs a user that the plurality of captured user movement data differs from the preconfigured body position sequence and an aggregate value of the difference between different body positions; and
   displaying the generated instruction as a real-time written message on a display screen of the augmented reality device or the virtual reality device.

8. The computer system of claim 7, wherein determining a body position quality threshold is not satisfied further comprises:
   incrementing a counter by one unit.

9. The computer system of claim 8, further comprising:
   determining an observation cycle threshold is satisfied based on the incremented counter.

10. The computer system of claim 7, wherein the one or more sensors is selected from a group consisting of a gyroscope, an accelerometer, a magnetometer, an eye gaze tracker, or a heart rate monitor.

11. The computer system of claim 7, further comprising:
   filtering the generated instruction based on a plurality of user preferences.

12. The computer system of claim 7, wherein calculating the body position difference further comprises:
   calculating a series of correlations, wherein the series of correlations are a correlation of a plurality of user eye gaze positions and a plurality of preconfigured eye gaze positions, a correlation of a plurality of user hand and body movements and a plurality of preconfigured hand and body movements, and a correlation of a plurality of preconfigured hand and body movements and a plurality of preconfigured eye gaze positions with a plurality of user hand and body movements and a plurality of user eye gaze positions.

13. A computer program product for sport training on an augmented reality device or a virtual reality device, the computer program product comprising:
   one or more non-transitory computer-readable tangible storage media and program instructions stored on at least one of the one or more non-transitory tangible storage media, the program instructions executable by a processor of a computer to perform a method, the method comprising:
   measuring a user body and eye gaze position based on a plurality of captured user movement data;
   calculating a body position difference by comparing the measured user body and eye gaze position with a preconfigured body position sequence, wherein the calculated body position difference comprises a numerical value for each portion of the user body that varies from the preconfigured body position sequence;
   in response to determining a body position quality threshold has not been satisfied based on the calculated body position difference, generating an instruction based on the calculated body position difference, wherein the generated instruction informs a user that the plurality of captured user movement data differs from the preconfigured body position sequence and an aggregate value of the difference between different body positions; and
   displaying the generated instruction as a real-time written message on a display screen of the augmented reality device or the virtual reality device.

14. The computer program product of claim 13, wherein determining a body position quality threshold is not satisfied further comprises:
   incrementing a counter by one unit.

15. The computer program product of claim 14, further comprising:
   determining an observation cycle threshold is satisfied based on the incremented counter.

* * * * *